United States Patent
Fukuda

(10) Patent No.: US 9,578,264 B2
(45) Date of Patent: Feb. 21, 2017

(54) IMAGE PROCESSING DEVICE, IMAGING DEVICE, AND IMAGE PROCESSING METHOD

(71) Applicant: OLYMPUS CORPORATION, Tokyo (JP)

(72) Inventor: Takanori Fukuda, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 262 days.

(21) Appl. No.: 14/330,287

(22) Filed: Jul. 14, 2014

(65) Prior Publication Data
US 2016/0014354 A1 Jan. 14, 2016
US 2016/0241798 A9 Aug. 18, 2016

Related U.S. Application Data

(63) Continuation of application No. PCT/JP2012/084176, filed on Dec. 28, 2012.

(30) Foreign Application Priority Data

Mar. 9, 2012 (JP) .................................. 2012-052853

(51) Int. Cl.
*H04N 5/349* (2011.01)
*H04N 9/04* (2006.01)
(Continued)

(52) U.S. Cl.
CPC ............. *H04N 5/349* (2013.01); *G06T 3/4015* (2013.01); *G06T 5/50* (2013.01); *H04N 5/23232* (2013.01); *H04N 9/045* (2013.01); *H04N 9/07* (2013.01)

(58) Field of Classification Search
CPC ................................. H04N 5/349; H04N 9/045
See application file for complete search history.

(56) References Cited

U.S. PATENT DOCUMENTS 6,678,000 B1   1/2004  Sakata
8,040,558 B2 * 10/2011  Dosluoglu ............ G06T 3/4015
                                                        348/230.1
2003/0222262 A1  12/2003  Oda et al.

FOREIGN PATENT DOCUMENTS

JP     11-018097 A    1/1999
JP     2001-008217 A  1/2001
(Continued)

OTHER PUBLICATIONS

International Search Report dated Feb. 5, 2013 issued in PCT/JP2012/084176.

*Primary Examiner* — Twyler Haskins
*Assistant Examiner* — Padma Haliyur
(74) *Attorney, Agent, or Firm* — Scully, Scott, Murphy & Presser, PC

(57) ABSTRACT

An image processing device includes an image acquisition section that acquires a plurality of images captured while sequentially shifting the relative positions of a light-receiving plane of an image sensor and an image formed in the light-receiving plane, and an estimation calculation section that estimates a high-resolution image based on the plurality of images, the high-resolution image having a number of pixels larger than that of each of the plurality of images. The estimation calculation section estimates the pixel values of the high-resolution image corresponding to a first color based on the pixel values of the plurality of images corresponding to a second color when the estimation calculation section has determined that the pixel values of the plurality of images corresponding to the first color and the pixel values of the plurality of images corresponding to the second color have a high correlation.

15 Claims, 13 Drawing Sheets

(51) Int. Cl.
*G06T 5/50* (2006.01)
*G06T 3/40* (2006.01)
*H04N 5/232* (2006.01)
*H04N 9/07* (2006.01)

(56) References Cited

FOREIGN PATENT DOCUMENTS

| | | |
|---|---|---|
| JP | 2001-313872 A | 11/2001 |
| JP | 2001-326942 A | 11/2001 |
| JP | 2002-262301 A | 9/2002 |
| JP | 2003-348452 A | 12/2003 |
| JP | 2005-143031 A | 6/2005 |

\* cited by examiner

FIG. 2
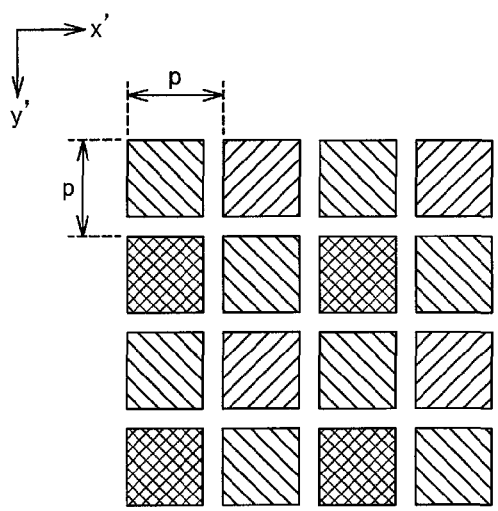
PS1
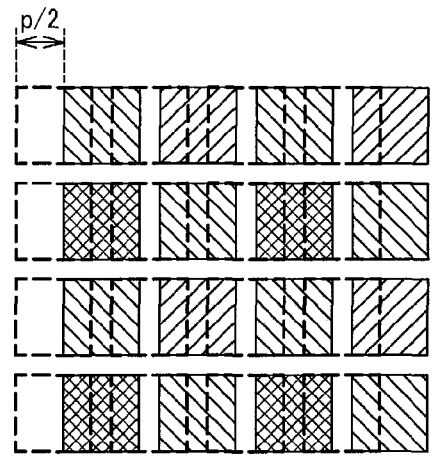
PS2
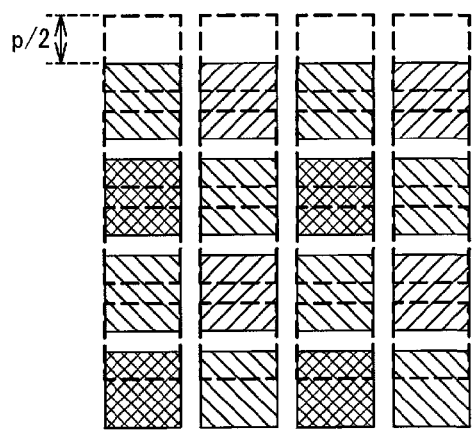
PS3
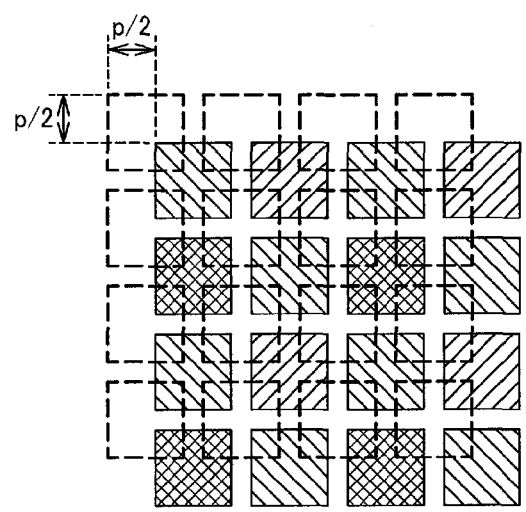
PS4
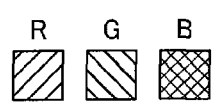

GREEN
$b^G_{x+i,y+j}$

IMAGE PROCESSING DEVICE, IMAGING DEVICE, AND IMAGE PROCESSING METHOD

CROSS REFERENCE TO RELATED APPLICATION

This application is a continuation of International Patent Application No. PCT/JP2012/084176, having an international filing date of Dec. 28, 2012, which designated the United States, the entirety of which is incorporated herein by reference. Japanese Patent Application No. 2012-052853 filed on Mar. 9, 2012 is also incorporated herein by reference in its entirety.

BACKGROUND

The present invention relates to an image processing device, an imaging device, an image processing method, and the like.

It has become possible to capture a high-resolution image along with an increase in the number of pixels of image sensors. However, when the pixel size is merely reduced to increase the number of pixels, the light intensity per pixel decreases, and the S/N ratio deteriorates, for example. Specifically, good image quality is not necessarily obtained by merely reducing the pixel size. A pixel-shift imaging method has been proposed to deal with such a problem (see JP-A-11-18097 and JP-A-2005-143031, for example). According to the pixel-shift imaging method, since only the sampling interval can be reduced to be smaller than the pixel size while maintaining the pixel size, it is possible to obtain a high-resolution image without causing a deterioration in S/N ratio as compared with the case of capturing an image using an image sensor having an identical pixel size without performing a pixel shift.

JP-A-11-18097 discloses a method that captures an image while performing a pixel shift (⅔ pixel pitch) three times in the horizontal scan direction and three times in the vertical scan direction (nine times in total) so that the resulting color data has the same arrangement as that of the original color data. JP-A-2005-143031 discloses a method that captures an image while performing a pixel shift once in the vertical scan direction (1 pixel pitch) and four times in the horizontal scan direction (½ pixel pitch) (five times in total) to acquire color data having a honeycomb-like arrangement. A method that captures an image while performing a pixel shift (½ pixel pitch) four times in the horizontal scan direction and four times in the vertical scan direction (sixteen times in total), and a method that captures an image while performing a pixel shift (⅓ pixel pitch) six times in the horizontal direction and six times in the vertical direction (thirty-six times in total), have also been known.

SUMMARY

According to one aspect of the invention, there is provided an image processing device comprising:

an image acquisition section that acquires a plurality of images, the plurality of images having been captured while sequentially shifting relative positions of a light-receiving plane of an image sensor and an image formed in the light-receiving plane; and an estimation calculation section that estimates a high-resolution image based on the plurality of images, the high-resolution image having a number of pixels larger than that of each of the plurality of images, at least pixels provided with a color filter corresponding to a first color and pixels provided with a color filter corresponding to a second color being arranged in the image sensor, and the estimation calculation section estimating pixel values of the high-resolution image corresponding to the first color based on pixel values of the plurality of images corresponding to the second color when the estimation calculation section has determined that the pixel values of the plurality of images corresponding to the first color and the pixel values of the plurality of images corresponding to the second color have a high correlation.

According to another aspect of the invention, there is provided an imaging device comprising:

the above image processing device; and the image sensor.

According to another aspect of the invention, there is provided an imaging device comprising:

an image sensor that includes a color filter having a first array;

a shift control section that performs a shift control process that sequentially shifts relative positions of a light-receiving plane of the image sensor and an image formed in the light-receiving plane; and an estimation calculation section that estimates a high-resolution image based on a plurality of images captured while the shift control process is performed, the high-resolution image having a number of pixels larger than that of each of the plurality of images, the shift control section performing the shift control process so that pixel values of the plurality of images are arranged in a second array that differs from the first array when disposed at pixel positions corresponding to the shift, and the estimation calculation section estimating pixel values of the high-resolution image corresponding to each color based on the pixel values arranged in the second array.

According to another aspect of the invention, there is provided an image processing method comprising:

acquiring a plurality of images captured while sequentially shifting relative positions of a light-receiving plane of an image sensor and an image formed in the light-receiving plane, at least pixels provided with a color filter corresponding to a first color and pixels provided with a color filter corresponding to a second color being arranged in the image sensor; and estimating pixel values of a high-resolution image corresponding to the first color based on pixel values of the plurality of images corresponding to the second color when it has been determined that the pixel values of the plurality of images corresponding to the first color and the pixel values of the plurality of images corresponding to the second color have a high correlation, and estimating the high-resolution image, the high-resolution image having a number of pixels larger than that of each of the plurality of images.

BRIEF DESCRIPTION OF THE DRAWINGS

FIG. 2 is a view illustrating a pixel shift method.

FIGS. 5A and 5B are views illustrating a process that calculates the degree of color correlation.

DESCRIPTION OF EXEMPLARY EMBODIMENTS

Figure 1:
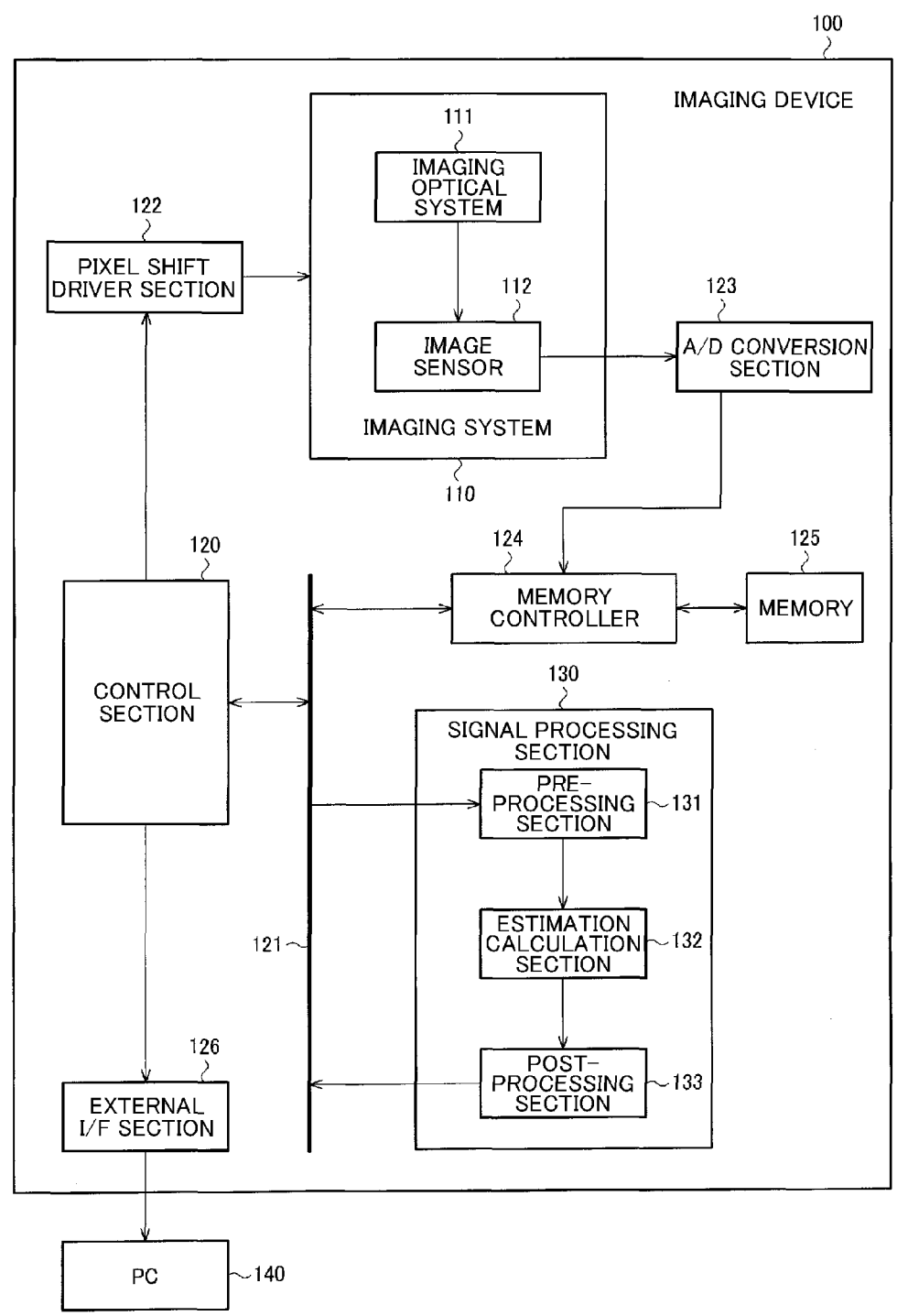
FIG. 1 illustrates a configuration example of an imaging device according to one embodiment of the invention.

A high-resolution image can be obtained using the pixel-shift imaging method. However, the pixel-shift imaging method has a problem in that the imaging time increases since an image is captured a plurality of times. Since the resolution increases as the shift pitch decreases, it is generally necessary to capture an image a numbers of times in order to obtain a high-resolution image using the pixel-shift imaging method.

When using the method disclosed in JP-A-11-18097, the number of pixel-shift imaging operations increases in order to obtain an image having the same arrangement as that of the color filter. When using the method disclosed in JP-A-2005-143031, the number of pixel-shift imaging operations increases in order to obtain an image having a honeycomb-like arrangement. When using the other known methods, the number of pixel-shift imaging operations increases in order to acquire the pixel values corresponding to all of the colors corresponding to each pixel. When the object changes with the passage of time (e.g., when observing fluorescence from the object, or when observing a moving object), the object changes during imaging when the imaging time is long, and a deterioration in image quality occurs.

Several aspects of the invention may provide an image processing device, an imaging device, an image processing method, and the like that can acquire a high-resolution image while reducing the number of pixel shifts.

According to one embodiment of the invention, there is provided an image processing device comprising:

an image acquisition section that acquires a plurality of images, the plurality of images having been captured while sequentially shifting relative positions of a light-receiving plane of an image sensor and an image formed in the light-receiving plane; and an estimation calculation section that estimates a high-resolution image based on the plurality of images, the high-resolution image having a number of pixels larger than that of each of the plurality of images, at least pixels provided with a color filter corresponding to a first color and pixels provided with a color filter corresponding to a second color being arranged in the image sensor, and the estimation calculation section estimating pixel values of the high-resolution image corresponding to the first color based on pixel values of the plurality of images corresponding to the second color when the estimation calculation section has determined that the pixel values of the plurality of images corresponding to the first color and the pixel values of the plurality of images corresponding to the second color have a high correlation.

According to one aspect of the invention, a plurality of images are captured while performing the pixel shift using the image sensor in which at least pixels provided with a color filter corresponding to the first color and pixels provided with a color filter corresponding to the second color are arranged, and the pixel values of the high-resolution image corresponding to the first color are estimated based on the pixel values corresponding to the second color when it has been determined that the pixel values corresponding to the first color and the pixel values corresponding to the second color have a high correlation. This makes it possible to acquire a high-resolution image while reducing the number of pixel shifts.

Exemplary embodiments of the invention are described in detail below. Note that the following exemplary embodiments do not in any way limit the scope of the invention defined by the claims laid out herein. Note also that all of the elements described below in connection with the exemplary embodiments should not necessarily be taken as essential elements of the invention.

1. Imaging Device

FIG. 1 illustrates a configuration example of an imaging device according to one embodiment of the invention. An imaging device 100 illustrated in FIG. 1 includes an imaging system 110, a control section 120, a bus 121, a pixel shift driver section 122 (pixel shift mechanism), an A/D conversion section 123, a memory controller 124, a memory 125, an external interface 126, and a signal processing section 130.

The imaging device 100 converts optical image information into electrical signals, and electronically records the electrical signals (image information) on a recording medium. The imaging device 100 may be a digital still camera, a digital movie camera, or the like.

The imaging system 110 includes an imaging optical system 111 and an image sensor 112. The image sensor 112 captures an image (light) formed by the imaging optical system 111. The image sensor 112 includes a Bayer color filter array. The Bayer array is an array in which 2×2 pixels form one unit. One unit of the Bayer array includes one pixel provided with a color filter that allows R (red) light to pass through, two pixels provided with a color filter that allows G (green) light to pass through, and one pixel provided with a color filter that allows B (blue) light to pass through. Note that the color filter of the image sensor 112 is not limited thereto. The color filter of the image sensor 112 may be a color filter in which colors other than RGB are arranged, or may be a color filter having an array other than the Bayer array. For example, the color filter of the image sensor 112 may be a color filter in which CMY (complementary color) pixels are arranged.

The pixel shift driver section 122 subjects the imaging system 110 to a pixel shift based on a control signal output from the control section 120. The pixel shift driver section 122 implements the pixel shift by moving the image sensor 112, for example. The pixel shift driver section 122 may implement the pixel shift by moving the imaging optical system 111 to move the luminous flux without moving the image sensor 112. The pixel shift method is described in detail later.

The A/D conversion section 123 converts the analog signals output from the image sensor 112 into digital data, and the memory controller 124 stores the digital data in the memory 125. For example, the A/D conversion process and the storage process are performed successively while the pixel shift is performed. The memory controller 124 transmits the digital data (image) stored in the memory 125 to the signal processing section 130 through the bus 121.

The signal processing section 130 includes a preprocessing section 131, an estimation calculation section 132, and a postprocessing section 133. The preprocessing section 131 performs preprocessing such as a process that removes a black offset from the image, and a process that adjusts the white balance of the image. The estimation calculation section 132 calculates a high-resolution image by performing an estimation process based on the image subjected to preprocessing. The estimation process is performed while taking account of the effects of the pixel shift. The estimation process is described in detail later. The postprocessing section 133 performs postprocessing (e.g., color correction process and gamma correction process) on the image subjected to the estimation process. The postprocessing section 133 transmits the resulting image to the control section 120 through the bus 121.

The control section 120 controls each section of the imaging device 100. The control section 120 transmits the image received from the postprocessing section 133 to a PC 140 through the external interface 126. The PC 140 displays the received image on a monitor, and records the received image on a recording medium, for example. Note that the imaging device 100 may include a monitor display section that displays an image, and a recording control section that records an image on a recording medium (i.e., the imaging device 100 may display an image on a monitor, and record an image on a recording medium).

Although FIG. 1 illustrates an example in which the imaging device 100 performs the estimation process, an information processing device (e.g., PC 140) that is provided separately from the imaging device 100 may perform the estimation process. In this case, the image subjected to preprocessing may be transmitted to the information processing device through the external interface 126, and subjected to the estimation process to generate a high-resolution image.

2. Pixel Shift Method

The pixel shift method is described below with reference to FIG. 2. In FIG. 2, P is the pixel pitch of the image sensor, x' is the horizontal scan direction, and y' is the vertical scan direction. Each hatched square is the R, G, or B pixel of the image sensor 112, and the pixels are arranged in the Bayer array. Each square indicated by the dotted line indicates a first position PS1.

The term "pixel shift" used herein refers to an operation that shifts the relative positional relationship between the object image formed by the imaging optical system 111 and the light-receiving plane of the image sensor 112. The first position PS1 is a reference position of the relative positional relationship. A second position PS2 is a position that is shifted by a ½ pixel pitch from the first position PSI in the x'-direction. A third position PS3 is a position that is shifted by a ½ pixel pitch from the first position PS1 in the y'-direction, and a fourth position PS4 is a position that is shifted by a ½ pixel pitch from the first position PS1 in the x'-direction and is shifted by a ½ pixel pitch from the first position PS1 in the y'-direction. An image is captured while sequentially performing the pixel shift to the positions PS1 to PS4 (pixel-shift imaging process).

As described above, the shift interval is the ½ pixel, and the pixel shift at the shift interval is performed twice in the horizontal scan direction, and performed twice in the vertical scan direction (i.e., four images are captured in total in one pixel-shift imaging cycle). Note that the pixel shift may be performed in an arbitrary order (i.e., the pixel shift need not necessarily be performed in order of the position PS1, the position PS2, the position PS3, and the position PS4).

3. Estimation Process

Figure 3:
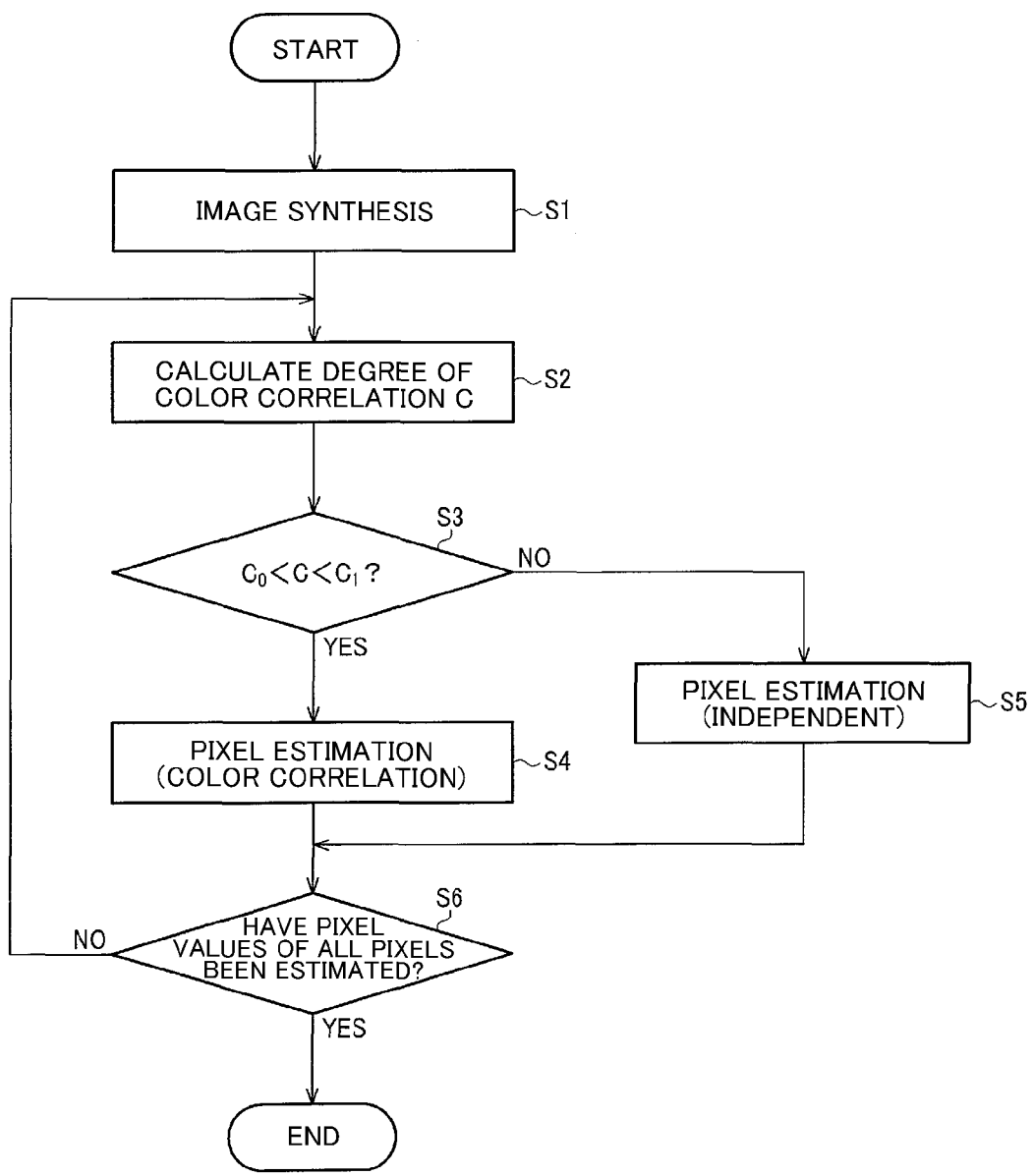
FIG. 3 is a flowchart illustrating an estimation process.

FIG. 3 illustrates a flowchart of the estimation process performed by the estimation calculation section 132. In a step S1, four pieces of captured image data respectively captured at the positions PS1 to PS4 are synthesized to obtain one piece of image data. The synthesized image data is loaded into a memory, and referred to during image processing performed in a step S2 and the subsequent steps. The details of the process performed in the step S1 are described later with reference to FIG. 4. Note that the step S1 (image synthesis) need not necessarily be performed. For example, four pieces of image data may be separately loaded into a memory, and pixel data among the four pieces of image data necessary for processing may be referred to during image processing performed in the step S2 and the subsequent steps.

In the step S2, the degree of color correlation C is calculated corresponding to each processing target pixel (or each area including the processing target pixel). The degree of color correlation C is an index that is used in the subsequent estimation process to determine whether or not a spatial change in pixel value is equal between two different colors (i.e., a color X and a color Y described later). In one embodiment of the invention, the ratio of the variance values of two colors in the processing area is used as the degree of color correlation C. The details of the process performed in the step S2 are described later with reference to FIG. 5A and the like. Note that the degree of color correlation C is not limited to the ratio of the variance values of two colors. It suffices that the degree of color correlation C be an index by which the degree of correlation of a spatial change in pixel value between two different colors can be evaluated. For example, a correlation value obtained by a matched filter may be used as the index. In this case, FFT is performed corresponding to each area, and a correlation value between two colors in the frequency domain is calculated, and used as the degree of color correlation C.

In a step S3, whether or not the degree of color correlation C satisfies a given condition is determined. Specifically, it is considered that the correlation between two colors is high when the degree of color correlation C is a value close to 1, and is low when C<<1 or 1<<C. In one embodiment of the invention, threshold values $C_0$ (<1) and $C^1$ (>1) are set, and the correlation between two colors is determined to be high when $C_0<C<C_1$ is satisfied.

In one embodiment of the invention, the estimation calculation section 132 determines whether or not the correlation between two colors is high. Note that the configuration is not limited thereto. For example, a determination section may be additionally provided, and determine whether or not the correlation between two colors is high.

When it has been determined that the correlation between two colors is high in the step S3, the pixel values of the high-resolution image are estimated based on the color correlation (step S4). For example, when the two colors are G and R, and the G pixel values of the high-resolution image are estimated, the G pixel values are estimated using the G pixel values and the R pixel values of the images captured while performing the pixel shift.

When it has been determined that the correlation between two colors is low in the step S3, the pixel values of the high-resolution image are estimated independently (estimated on a color basis) (step S5). For example, when the two colors are G and R, and the G pixel values of the high-resolution image are estimated, the G pixel values are estimated using only the G pixel values of the images captured while performing the pixel shift. The details of the process performed in the step S4 and the process performed in the step S5 are described later with reference to FIG. 6A and the like.

In a step S6, whether or not the pixel values of all of the pixels of the high-resolution image have been estimated is determined. When it has been determined that the pixel values of all of the pixels of the high-resolution image have not been estimated, the steps S2 to S5 are performed again. When it has been determined that the pixel values of all of the pixels of the high-resolution image have been estimated, the process is terminated.

4. Image Synthesis Process

Figure 4:
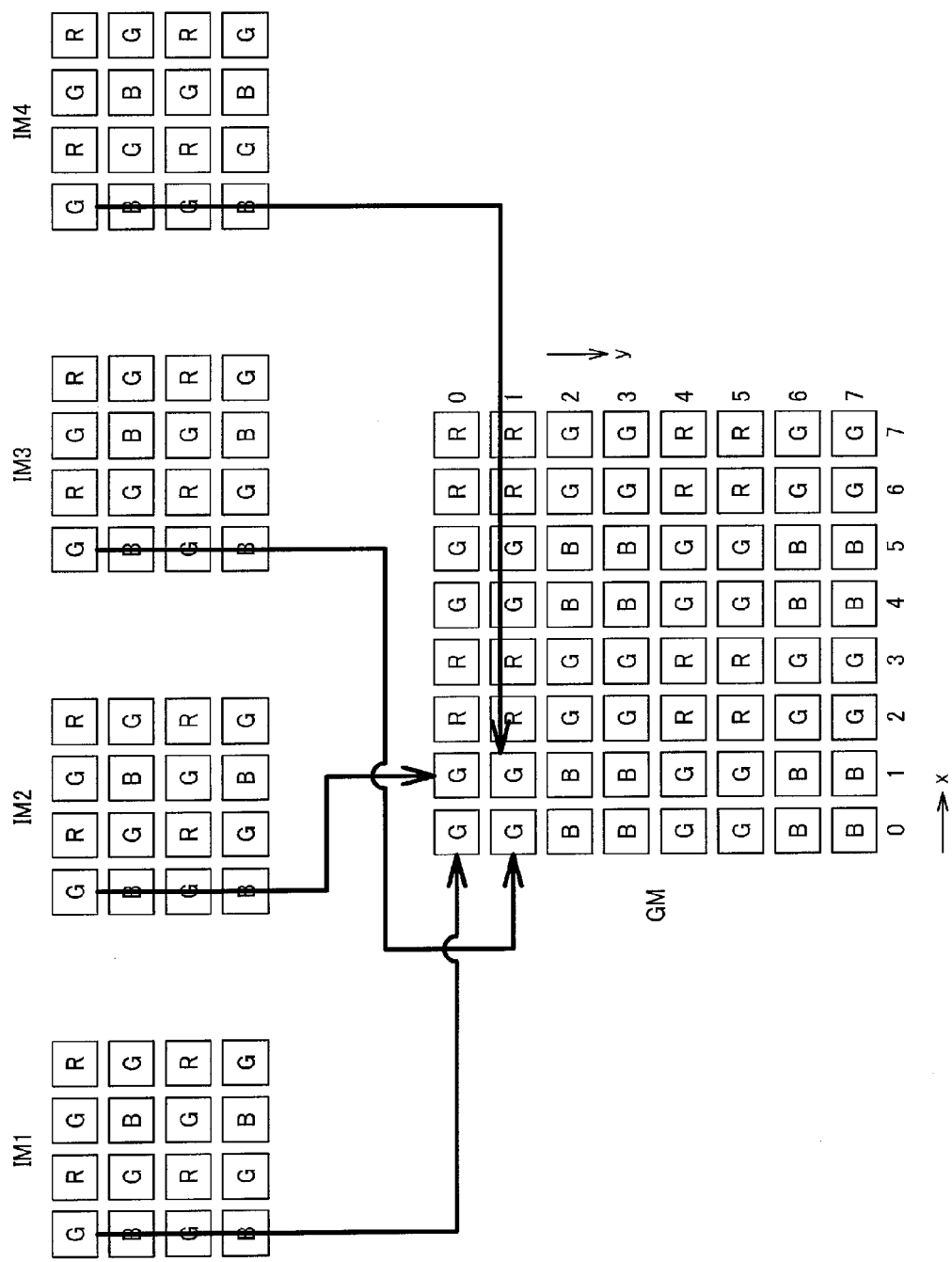
FIG. 4 is a view illustrating an image synthesis process.

The details of the image synthesis process performed in the step S1 are described below with reference to FIG. 4. As illustrated in FIG. 4, images IM1 to IM4 respectively captured at the positions PS1 to PS4 are synthesized to generate a synthesized image GM having a number of pixels larger than that of the images IM1 to IM4 by a factor of 2×2.

The pixels of the images IM1 to IM4 are respectively disposed at the pixel positions corresponding to the shift positions illustrated in FIG. 2. Specifically, when the pixel position of the synthesized image GM is indicated by (x, y), and n is an integer equal to or larger than 0, each pixel of the image IM1 is disposed at (x, y)=(2n, 2n) corresponding to the reference position PS1. Each pixel of the image IM2 is disposed at (x, y)=(2n+1, 2n) corresponding to the position PS2 that is shifted from the reference position PS1 by a ½ pixel in the horizontal scan direction x'. Each pixel of the image IM3 is disposed at (x, y)=(2n, 2n+1) corresponding to the position PS3 that is shifted from the reference position PS1 by a ½ pixel in the vertical scan direction y'. Each pixel of the image IM4 is disposed at (x, y)=(2n+1, 2n+1) corresponding to the position PS4 that is shifted from the reference position PS1 by a ½ pixel in the horizontal scan direction x' and the vertical scan direction y'.

Note that the pixel arrangement of the synthesized image GM is determined corresponding to the shift method. Specifically, the pixel data is rearranged so that the center-of-gravity position of the captured pixel is sequentially arranged. A shift method (e.g., a 3×3 shift method (⅓ pixel pitch)) differing from the above shift method may also be employed, and a synthesized image having a pixel arrangement corresponding to the shift method is generated.

5. Process that Calculates Degree of Color Correlation

The details of the process that calculates the degree of color correlation performed in the step S2 are described below with reference to FIGS. 5A and 5B.

The ratio C of the variance value of a color Y to the variance value of a color X is calculated to be the degree of color correlation (see the following expressions (1) to(3)). The color X and the color Y are set to (X, Y)=(R, G), (G, R), (B, G), or (G, B) corresponding to the pixel position subjected to the estimation process. An example in which (X, Y)=(G, R) is described below.

$$C = \frac{\sum_{i=-2,-1,2,3, j=-4,-3,0,1,4,5}(a^Y_{x+i,y+j} - \tilde{a}^Y_{x,y})^2/24}{\sum_{i,j=-4,-3,0,1,4,5}(a^X_{x+i,y+j} - \tilde{a}^X_{x,y})^2/36} \quad (1)$$

$$\tilde{a}^X_{x,y} = \sum_{i,j=-4,-3,0,1,4,5} a^X_{x+i,y+j}/36 \quad (2)$$

$$\tilde{a}^Y_{x,y} = \sum_{i=-2,-1,2,3, j=-4,-3,0,1,4,5} a^Y_{x+i,y+j}/24 \quad (3)$$

Figures 5A, 5B:
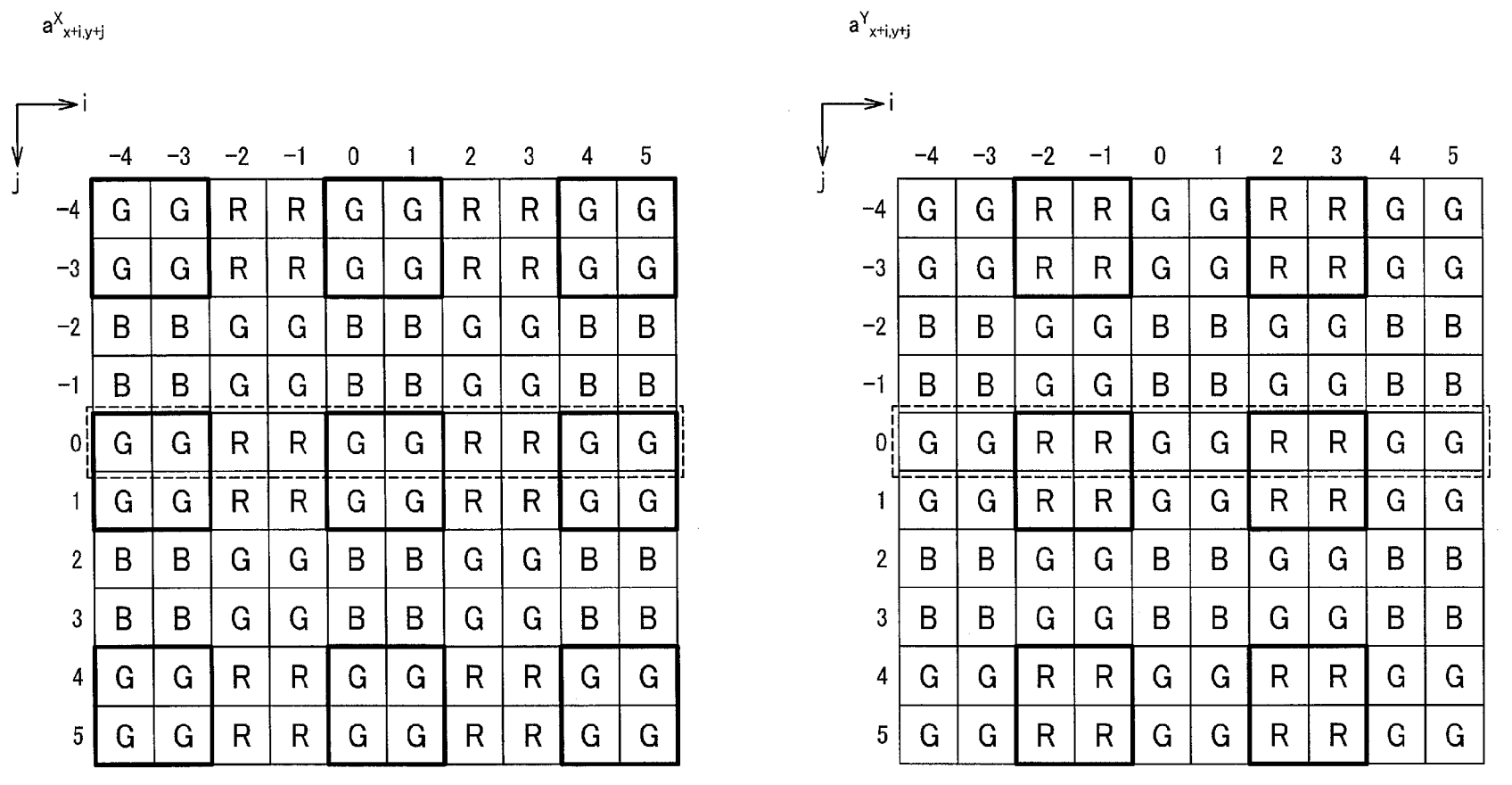

Note that $a^X_{x+i, y+j}$ is the pixel value corresponding to the color X at the position (x+i, y+j) of the synthesized image GM, and corresponds to the pixels enclosed by each bold solid line in FIG. 5A. $a^Y_{x+i, y+j}$ is the pixel value corresponding to the color Y at the position (x+i, y+j) of the synthesized image GM, and corresponds to the pixels enclosed by each bold solid line in FIG. 5B. The pixels (i=−4 to 5, and j=0 (or i=−4 to 5, and j=1)) enclosed by the dotted line are pixels subjected to the estimation process. The pixel position of the synthesized image GM is linked to the pixel position of the estimated image. The pixels ($b^G_{x-5, y}$ to $b^G_{x+5, y}$ in FIG. 7) at the corresponding positions of the estimated image are estimated using the pixels enclosed by the dotted line.

6. Estimation Process

The details of the estimation process performed in the step S4 or S5 are described below with reference to FIGS. 6A to 14C. An example in which the resolution is increased in the horizontal scan direction, and then increased in the vertical scan direction is described below. Note that the configuration is not limited thereto. The resolution may be increased in the vertical scan direction, and then increased in the horizontal scan direction.

Figure 6A:
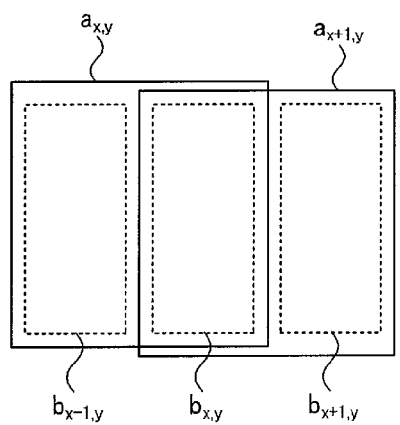
FIGS. 6A and 6B are views illustrating a pixel value and an estimated pixel value.

As illustrated in FIG. 6A, since the images captured while performing the pixel shift by a ½ pixel pitch are sampled to overlap each other by a ½ pixel, the images overlap each other as to the optical image information. The pixel value $a_{x, y}$ and the pixel value $a_{x+1, y}$ are pixel values that are shifted by a ½ pixel pitch in the horizontal scan direction (e.g., the pixel value of the image IM1 and the pixel value of the IM2 in FIG. 4), and share the pixel value $b_{x, y}$. These pixel values have the relationship represented by the following expression (4).

$$\begin{cases} b_{x-1,y} + b_{x,y} = a_{x,y} \\ b_{x,y} + b_{x+1,y} = a_{x+1,y} \end{cases} \quad (4)$$

Figure 6B:
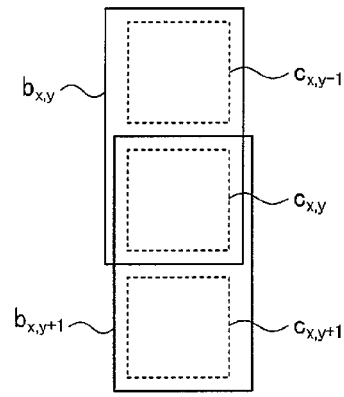

As illustrated in FIG. 6B, the pixels also overlap each other in the vertical scan direction, and the pixel value $b_{x, y}$ and the pixel value $b_{x, y+1}$ share the pixel value $c_{x, y}$. These pixel values have the relationship represented by the following expression (5). As is clear from the expressions (4) and (5), the pixel value $a_{x, y}$ is the sum of four pixel values $c_{x, y}$. Specifically, the number of pixels of the estimated image that includes the pixel values $c_{x, y}$ is four times larger than that of one captured image.

$$\begin{cases} c_{x-1,y} + c_{x,y} = b_{x,y} \\ c_{x,y} + c_{x+1,y} = b_{x+1,y} \end{cases} \quad (5)$$

In one embodiment of the invention, the pixel value $b_{x, y}$ is estimated from the pixel value $a_{x, y}$ captured while performing the pixel shift, and the pixel value $c_{x, y}$ is estimated from the pixel value $b_{x, y}$. The pixel value $b_{x, y}$ and the pixel value $c_{x, y}$ may be hereinafter referred to as "estimated pixel value". Note that the pixel value $b_{x, y}$ may be appropriately referred to as "intermediate pixel value", and the pixel value $c_{x, y}$ may be appropriately referred to as "final estimated pixel value".

The following expression (6) represents that the estimated pixel values $b_{x-1, y}$, $b_{x, y}$, and $b_{x+1, y}$ change linearly.

$$b_{x,y} - b_{x-1,y} = b_{x+1,y} - b_{x,y} \quad (6)$$

The estimated pixel values are given by the following expression (7) from the expressions (4) and (6).

$$b_{x-1,y} = \frac{3}{4}a_{x,y} - \frac{1}{4}a_{x+1,y} \quad (7)$$

$$b_{x,y} = \frac{1}{4}a_{x,y} + \frac{1}{4}a_{x+1,y}$$

$$b_{x+1,y} = \frac{3}{4}a_{x+1,y} - \frac{1}{4}a_{x,y}$$

However, it is rare that the pixel values change linearly in the actual situation, and the actual pixel values generally differ from the linear estimated pixel values. When the difference between the actual estimated pixel value and the linear estimated pixel value is referred to as $\delta_{x, y}$, the estimated pixel value is given by the following expression (8). The difference $\delta_{x, y}$ is either a positive value or a negative value. The sign of the difference $\delta_{x, y}$ is determined so that the expression (4) is satisfied when the estimated pixel values are added up.

$$b_{x-1,y} = \frac{3}{4}a_{x,y} - \frac{1}{4}a_{x+1,y} - \delta_{x,y} \quad (8)$$

$$b_{x,y} = \frac{1}{4}a_{x,y} + \frac{1}{4}a_{x+1,y} + \delta_{x,y}$$

$$b_{x+1,y} = \frac{3}{4}a_{x+1,y} - \frac{1}{4}a_{x,y} - \delta_{x,y}$$

When the color X is G, and the color Y is R (see FIG. 7), the estimated pixel values $b^G_{x-5, y}$ to $b^G_{x+5, y}$ corresponding to the color G are calculated using the pixel values $a^G_{x-4, y}$ to $a^G_{x+5, y}$ corresponding to the color G or the color R that are arranged in the horizontal scan direction. The pixel values $a^G_{x-4, y}$ to $a^G_{x+5, y}$ refer to the pixel values of the pixels of the synthesized image GM that are enclosed by the dotted line (see FIG. 5A). The estimated pixel values among the estimated pixel values $b^G_{x-5, y}$ to $b^G_{x+5, y}$ that overlap the pixel corresponding to the color G are given by the following expression (9) in the same manner as the expression (8).

$$\begin{cases} b^X_{x-5,y} = \frac{3}{4}a^X_{x-4,y} - \frac{1}{4}a^X_{x-3,y} - \delta^X_{x-4,y} \\ b^X_{x-4,y} = \frac{1}{4}a^X_{x-4,y} + \frac{1}{4}a^X_{x-3,y} + \delta^X_{x-4,y} \\ b^X_{x-3,y} = \frac{3}{4}a^X_{x-3,y} - \frac{1}{4}a^X_{x-4,y} - \delta^X_{x-4,y} \\ b^X_{x-1,y} = \frac{3}{4}a^X_{x,y} - \frac{1}{4}a^X_{x+1,y} - \delta^X_{x,y} \\ b^X_{x,y} = \frac{1}{4}a^X_{x,y} + \frac{1}{4}a^X_{x+1,y} + \delta^X_{x,y} \\ b^X_{x+1,y} = \frac{3}{4}a^X_{x+1,y} - \frac{1}{4}a^X_{x,y} - \delta^X_{x,y} \\ b^X_{x+3,y} = \frac{3}{4}a^X_{x+5,y} - \frac{1}{4}a^X_{x+4,y} - \delta^X_{x+4,y} \\ b^X_{x+4,y} = \frac{1}{4}a^X_{x+4,y} + \frac{1}{4}a^X_{x+5,y} + \delta^X_{x+4,y} \\ b^X_{x+5,y} = \frac{3}{4}a^X_{x+4,y} - \frac{1}{4}a^X_{x+5,y} - \delta^X_{x+4,y} \end{cases} \quad (9)$$

Figure 8:
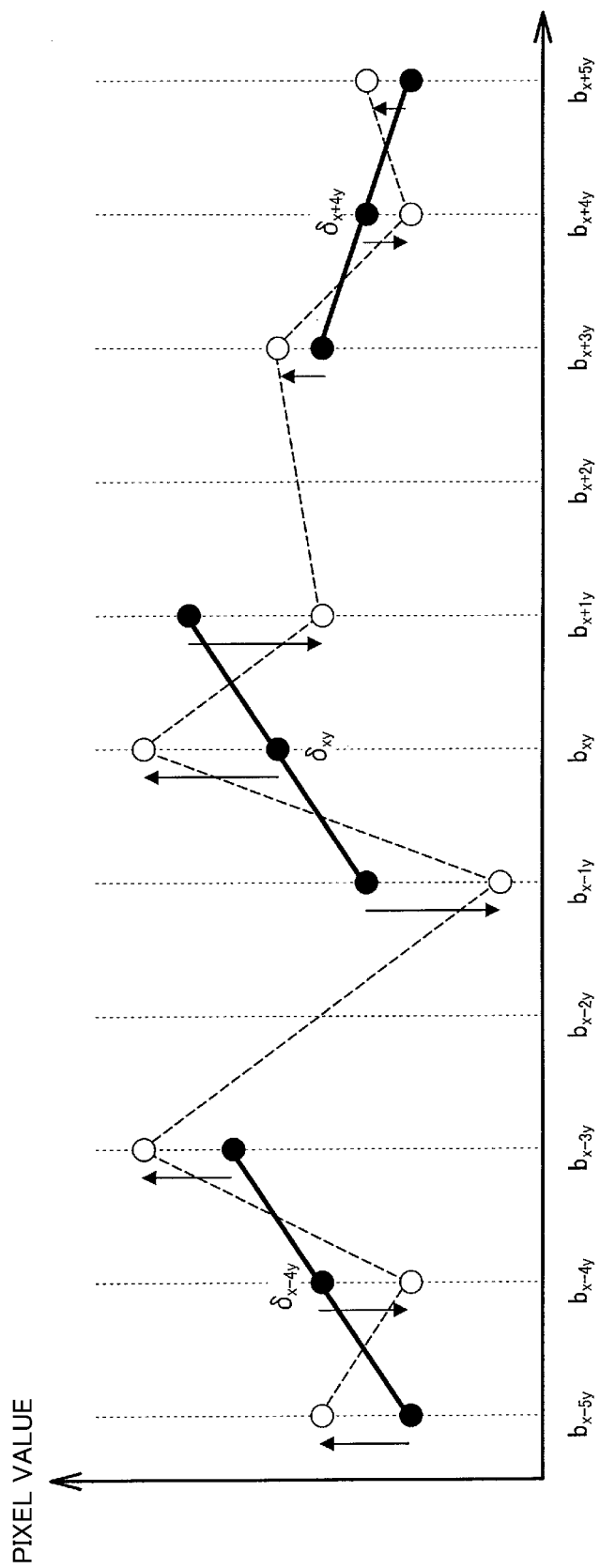
FIG. 8 is a view illustrating a pixel estimation process.

As illustrated in FIG. 8, the differences $\delta^X_{x-4, y}$, $\delta^X_{x, y}$, and $\delta^X_{x+4, y}$ in the expression (9) are the difference between the linear estimated pixel value (see each black circle) and the actual estimated pixel value (see each white circle). In FIG. 8, the superscript suffix is omitted for convenience of illustration. The difference between the estimated pixel values is calculated by the following expression (10) in order to calculate the three differences. The expression (10) is based on the pixel overlap relationship, and obtained by the expression (4).

$$\begin{cases} b^X_{x-1,y} - b^X_{x-3,y} = a^X_{x-1,y} - a^X_{x-2,y} \\ b^X_{x+3,y} - b^X_{x+1,y} = a^X_{x+3,y} - a^X_{x+2,y} \end{cases} \quad (10)$$

When the color X is G, and the color Y is R (see FIG. 7), the pixel values $a^G_{x-2, y}$, $a^G_{x-1, y}$, $a^G_{x+2, y}$, and $a^G_{x+1, y}$ corresponding to the color G on the right side of the expression (10) are absent, and only the pixel values corresponding to the color R are present instead. Therefore, the difference between the estimated pixel values corresponding to the color G is calculated using the pixel value corresponding to the color R or the peripheral pixel value corresponding to the color G Specifically, when it has been determined that $C_0 < C < C_1$ is satisfied in the step S3 in FIG. 3 (i.e., the correlation between the color X and the color Y is high), it is considered that the space derivative of the pixel values corresponding to the color X and the space derivative of the pixel values corresponding to the color Y are identical. Therefore, it is considered that the difference between the pixel values corresponding to the color X and the difference between the pixel values corresponding to the color Y are equal, and the following expression (11) is obtained. Specifically, the difference between the estimated pixel values corresponding to the color X can be calculated from the pixel values corresponding to the color Y when the degree of color correlation is high.

$$\begin{cases} b^X_{x-1,y} - b^X_{x-3,y} = a^Y_{x-1,y} - a^Y_{x-2,y} \\ b^X_{x+3,y} - b^X_{x+1,y} = a^Y_{x+3,y} - a^Y_{x+2,y} \end{cases} \quad (11)$$

The differences $\delta^X_{x-4, y}$, $\delta^X_{x, y}$, and $\delta^X_{x+4, y}$ can have an arbitrary value within the range in which the expressions (9) and (11) are satisfied. In particular, when the image is a natural image, the adjacent pixel values are normally close to each other, and it is considered that the differences $\delta^X_{x-4, y}$, $\delta^X_{x, y}$, and $\delta hu X_{x+4, y}$ are close to 0. Therefore, the differences $\delta^X_{x-4, y}$, $\delta^X_{x, y}$, and $\delta^X_{x+4, y}$ are determined to minimize the sum of squares $S_\delta$ given by the following expression (12). Specifically, the expression (9) is substituted into the expression (11) (i.e., $b_{x-3, y}$, $b_{x-1, y}$, $b_{x+1, y}$, and $b_{x+3, y}$ are deleted) to obtain a relational expression between the differences $\delta^X_{x-4, y}$, $\delta^X_{x, y}$, and $\delta^X_{x+4, y}$ and the pixel values $a^X$ and $a^Y$. Two differences among the differences $\delta^X_{x-4, y}$, $\delta^X_{x, y}$, and $\delta^X_{x+4, y}$ are deleted from the following expression (12) using the relational expression, and the remaining difference is calculated so that the sum of squares $S_\delta$ becomes a minimum. The calculated difference is substituted into the relational expression to calculate the remaining differences. The calculated differences are substituted into the expression (9) to determine the estimated pixel values.

$$S_\delta = \delta^{x^2}_{x-4, y} + \delta^{x^2}_{x, y} + \delta^{x^2}_{x+4, y} \tag{12}$$

When it has been determined that $C_0 < C < C_1$ is not satisfied in the step S3 in FIG. 3 (i.e., the correlation between the color X and the color Y is low), it is considered that the space derivative of the pixel value corresponding to the color X and the space derivative of the pixel value corresponding to the color Y are not equal. Since erroneous estimation occurs if the pixel value corresponding to the color Y is used when the color correlation is low, the difference between the estimated pixel values corresponding to the color X is calculated using the pixel value corresponding to the color X (see the following expression (13)).

$$\begin{cases} b^X_{x-1, y} - b^X_{x-3, y} = \frac{1}{3}a^X_{x, y} - \frac{1}{3}a^X_{x-3, y} \\ b^X_{x+3, y} - b^X_{x+1, y} = \frac{1}{3}a^X_{x+4, y} - \frac{1}{3}a^X_{x+1, y} \end{cases} \tag{13}$$

Figure 9:
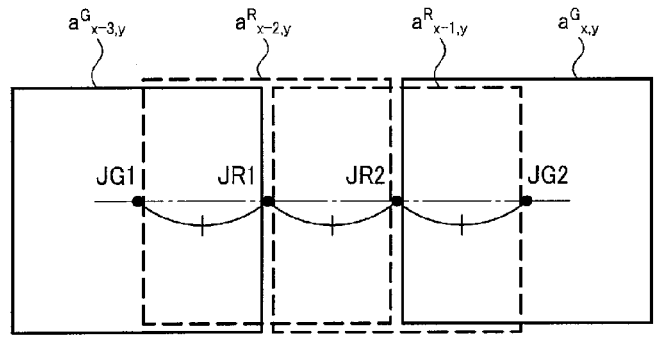
FIG. 9 is a view illustrating a pixel estimation process when the degree of color correlation is low.

When the color X is G, and the color Y is R, the distance between the center-of-gravity position JG1 of the pixel $a^G_{x-3, y}$ and the center-of-gravity position JG2 of the pixel $a^G_{x, y}$ is three times longer than the distance between the center-of-gravity position JR1 of the pixel $a^R_{x-2, y}$ and the center-of-gravity position JR2 of the pixel $a^R_{x-1, y}$ (see FIG. 9). When the pixel values $a^G_{x-2, y}$ and $a^G_{x-1, y}$ are present, and the pixel values $a^G_{x-3, y}$, $a^G_{x-2, y}$ and $a^G_{x-1, y}$, and $a^G_{x, y}$ change linearly, $a^G_{x-1, y} - a^G_{x-2, y} = \frac{1}{3}(a^G_{x, y} - a^G_{x-3, y})$ is satisfied from the above relationship. Therefore, the expression (10) can be obtained using the expression (13).

The differences $\delta^X_{x-4, y}$, $\delta^X_{x, y}$, and $\delta^X_{x+4, y}$ are determined from the expressions (9), (12), and (13) to minimize the sum of squares $S_\delta$, and substituted into the expression (9) to determine the estimated pixel values.

The above estimation process is sequentially performed while shifting the pixel position (x, y) to calculate the estimated pixel value $b^X_{x, y}$ corresponding to each pixel position (x, y). The estimation process is similarly performed when (X, G), (B, G), or (G, B) to calculate the estimated pixel value $b^X_{x, y}$ corresponding to each color.

Figure 10:
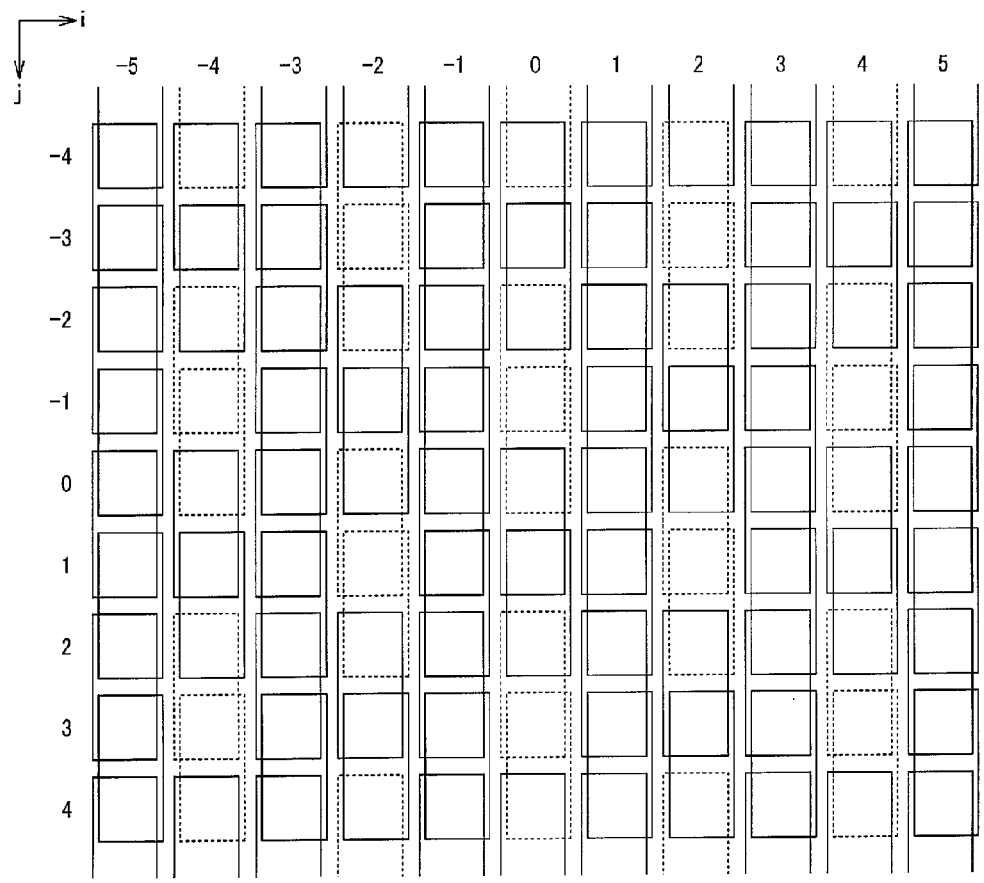
FIG. 10 is a view illustrating a pixel estimation process when the color X is G

The estimated pixel value $b^G_{x+i, y+j}$ indicated by each solid line in FIG. 10 is calculated corresponding to the color G Since the estimated pixel value $b^G_{x+i, y+j}$ indicated by each dotted line cannot be calculated by the estimation process, the estimated pixel value $b^G_{x+i, y+j}$ indicated by each dotted line is calculated by an interpolation process in the horizontal scan direction. For example, the estimated pixel value $b^G_{x-2, y}$ is interpolated using the pixel values $b^G_{x-3, y}$ and $b^G_{x-1, y}$ that are adjacent thereto in the horizontal scan direction.

Figure 11:
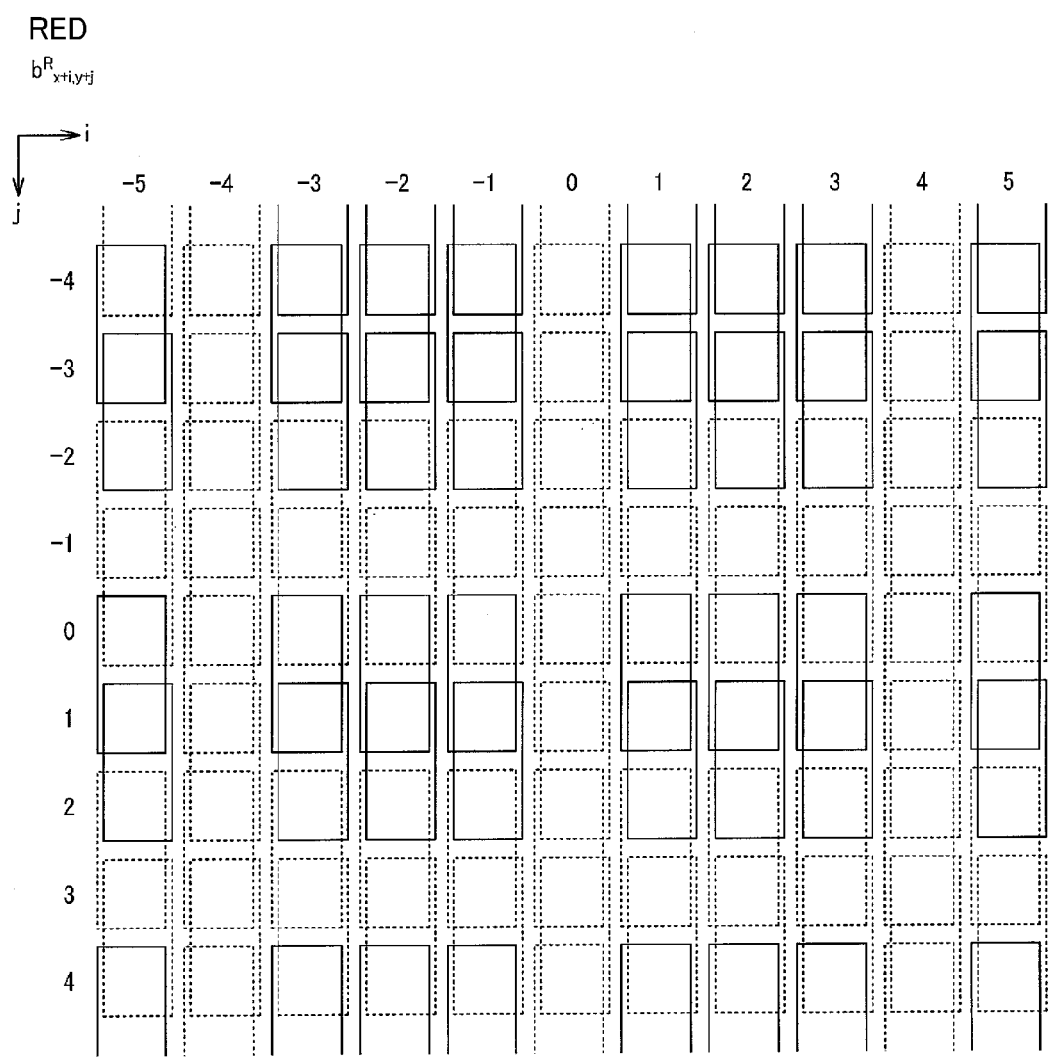
FIG. 11 is a view illustrating a pixel estimation process when the color X is R.
Figure 12:
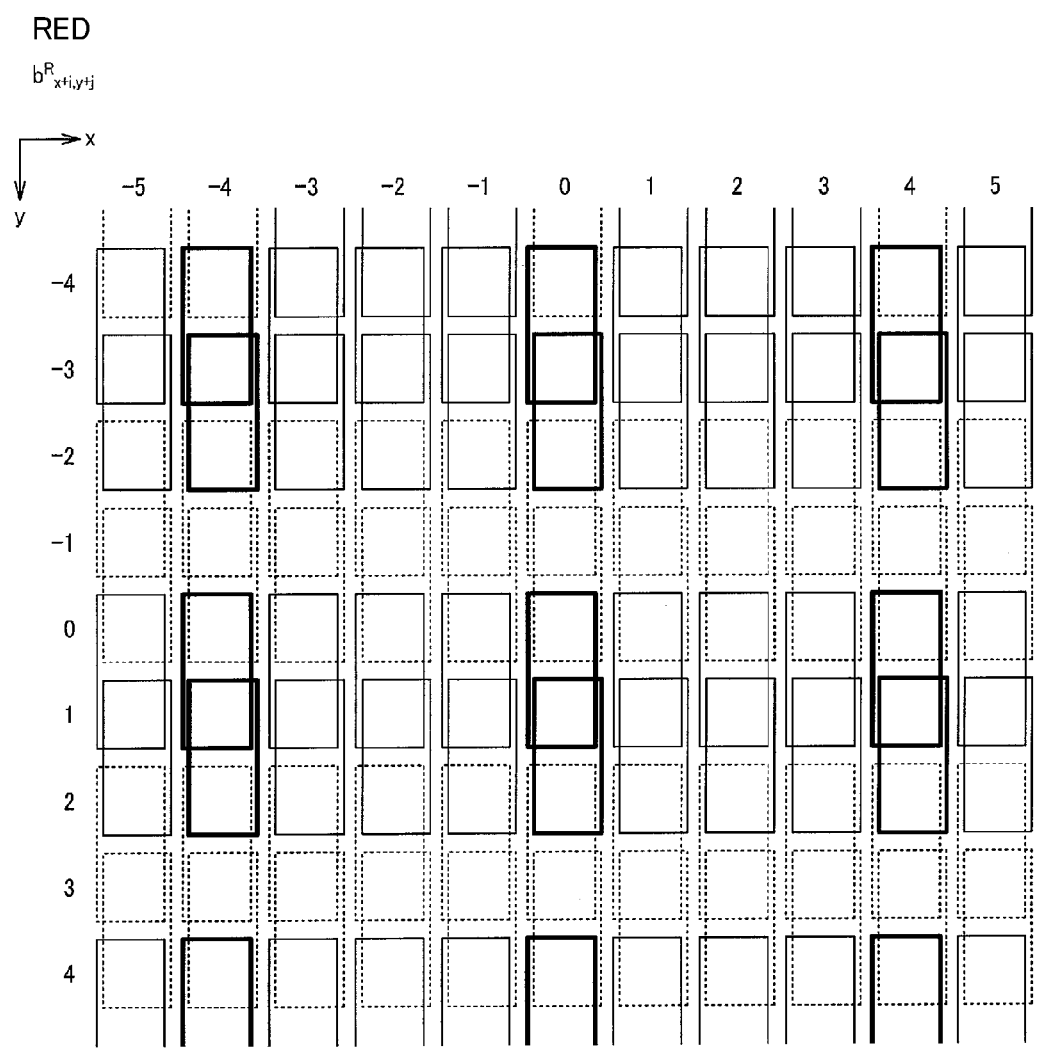
FIG. 12 is a view illustrating a pixel estimation process when the color X is R.

The estimated pixel value $b^R_{x+i, y+j}$ indicated by each solid line in FIG. 11 is calculated corresponding to the color R. Since the estimated pixel value $b^R_{x+i, y+j}$ indicated by each dotted line cannot be calculated by the estimation process, the estimated pixel value $b^R_{x+i, y+j}$ indicated by each dotted line is calculated by an interpolation process in the horizontal scan direction. The estimated pixel value $b^R_{x+i, y+j}$ indicated by each bold dotted line in FIG. 12 is calculated by the interpolation process.

The estimated pixel value $b^B_{x+i, y+j}$ at the pixel position that is shifted from the pixel position indicated by each solid line in FIG. 11 by −2 in the horizontal scan direction and +2 in the vertical scan direction is calculated corresponding to the color B. This is because the B pixel is situated at the position that is shifted from the position of the R pixel of the synthesized image GM illustrated in FIG. 4 by −2 in the horizontal scan direction and +2 in the vertical scan direction. The estimated pixel value that cannot be calculated by the estimation process is calculated by an interpolation process in the horizontal scan direction.

The final estimated pixel value $c^X_{x, y}$ is calculated from the estimated pixel value $b^X_{x, y}$. Since the adjacent estimated pixel values $b^X_{x, y}$ overlap each other in the vertical scan direction, the final estimated pixel value $C^X_{x, y}$ can be calculated from the estimated pixel value $b^X_{x, y}$ using the method described above with reference to FIGS. 7 to 9. Specifically, substitution from the expression (4) to the expression (5) may be applied to the expressions (6) to (13), and the estimation process may be performed using the resulting expressions.

Since the estimated pixel value $b^G_{x, y}$ corresponding to the color G is calculated by the interpolation process corresponding to each pixel position, it is unnecessary to determine the color correlation, and an expression obtained by rewriting the expression (10) to represent the relationship between the estimated pixel value $b^X_{x, y}$ and the final estimated pixel value $c^X_{x, y}$ may be applied directly. The final estimated pixel value $c^X_{x, y}$ corresponding to the color G is estimated corresponding to each pixel position.

Figure 13:
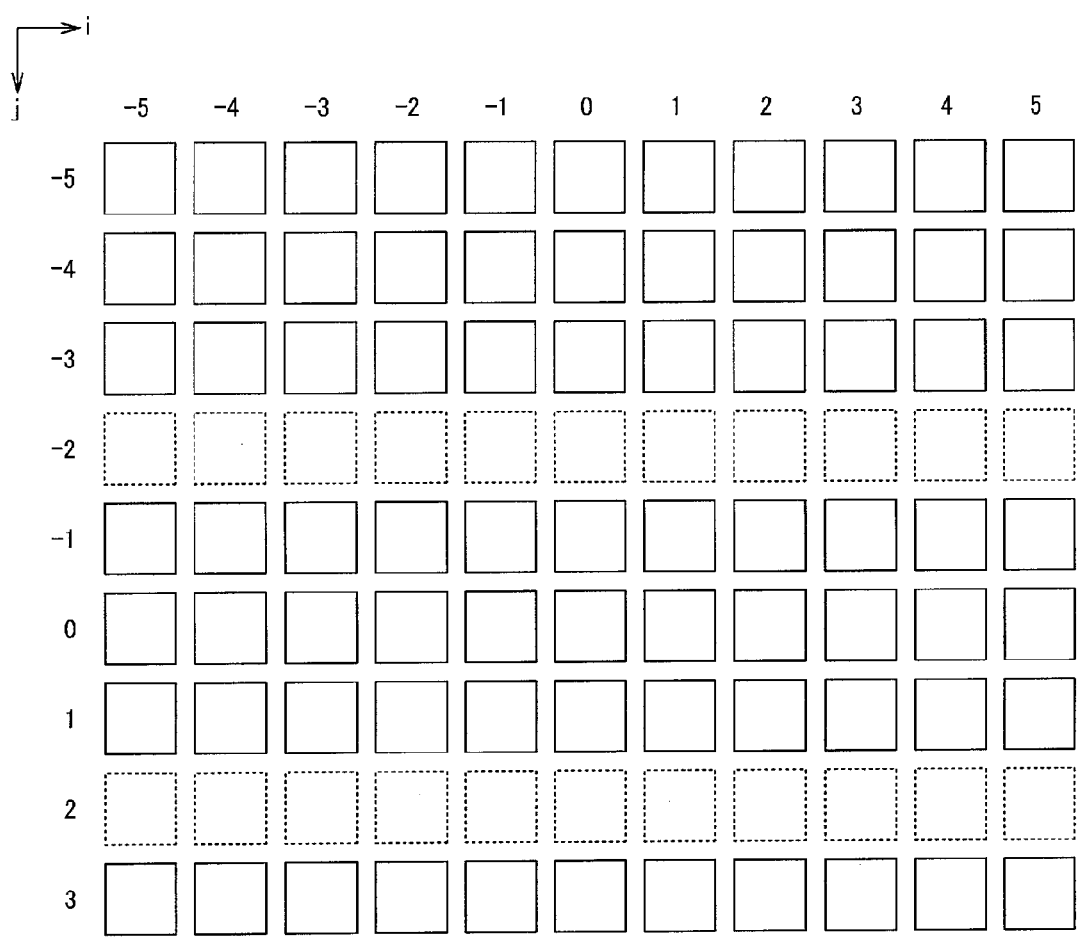
FIG. 13 is a view illustrating a pixel estimation process when the color X is R.

Since the estimated pixel value $b^R_{x, y}$ corresponding to the color R is present every two pixels (see FIG. 12), the estimation process is performed corresponding to the color correlation determination results. The estimated pixel value $c^R_{x+i, y+j}$ indicated by each solid line in FIG. 13 is calculated corresponding to the color R. Since the estimated pixel value $C^R_{x+i, y+j}$ indicated by each dotted line cannot be calculated by the estimation process, the estimated pixel value $C^R_{x+i, y+j}$ indicated by each dotted line is calculated by an interpolation process in the vertical scan direction. For example, the estimated pixel value $c^R_{x, y-2}$ is interpolated using the pixel values $c^R_{x, y-3}$ and $c^R_{x, y-1}$ that are adjacent thereto in the vertical scan direction. The estimated pixel value $cB_{x, y}$ corresponding to the color B is calculated by the estimation process and the interpolation process in the same manner as the estimated pixel value corresponding to the color R.

The final estimated pixel value $C^X_{x, y}$ thus calculated corresponds to a pixel having a size ½×½ times smaller than that of the pixel $a^X_{x, y}$ of the captured image. Specifically, pixel data can be obtained by the estimation process as if to capture an image using an image sensor having a pixel pitch ½×½ times smaller than that of the actual image sensor.

Figure 14A:
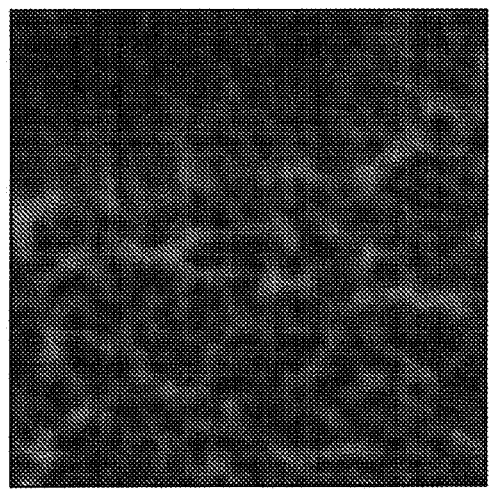
FIGS. 14A to 14C illustrate an example of a captured image.
Figure 14B:
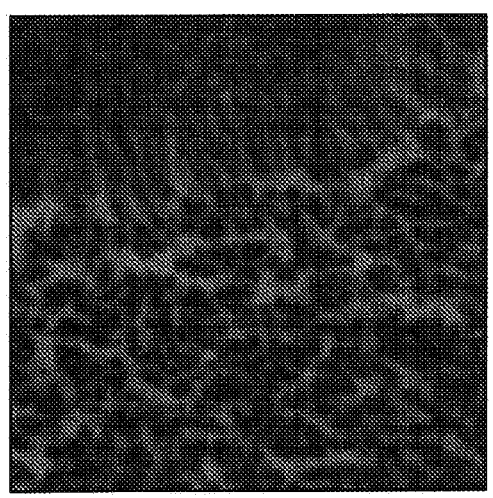
Figure 14C:
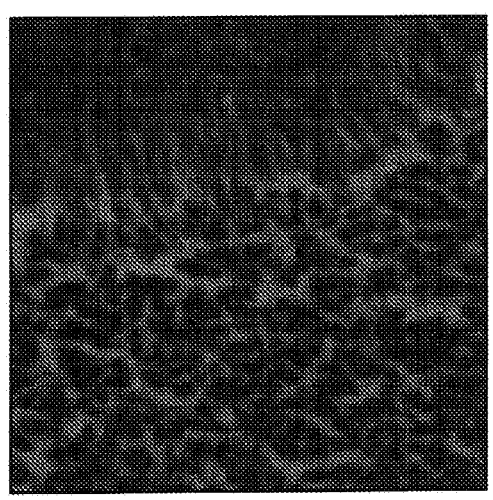

FIG. 14A illustrates an image captured without performing the pixel shift. FIG. 14B illustrates an image captured using a known method that performs the pixel shift 3×3 times at a ⅔ pixel pitch. FIG. 14C illustrates an image captured using the method according to one embodiment of the invention that performs the pixel shift 2×2 times at a ½ pixel pitch. As is clear from FIGS. 14A to 14C, the image captured using the method according to one embodiment of the invention has a resolution higher than that of the image captured without performing the pixel shift, and has an image quality almost equal to that of the image captured using the known method although the number of pixel shifts is reduced.

Although an example has been described above in which the estimation process is performed using eleven estimated pixel values $b^X_{x, y}$ as the processing unit (see FIG. 7), the configuration is not limited thereto. The estimation process may be performed using more than eleven estimated pixel values $b^X_{x, y}$ as the processing unit, or may be performed using less than eleven estimated pixel values $b^X_{x,y}$ as the processing unit. The estimation process may be performed taking another factor (e.g., noise) into consideration.

According to the embodiments of the invention, an image processing device includes an image acquisition section and the estimation calculation section 132 (see FIG. 1). As described above with reference to FIGS. 2 and 4, the image acquisition section acquires a plurality of images IM1 to IM4 that have been captured while sequentially shifting the relative positions of the light-receiving plane of the image sensor 112 and the image formed in the light-receiving plane. The estimation calculation section 132 estimates a high-resolution image based on the plurality of images IM1 to IM4, the high-resolution image having a number of pixels (e.g., 2×2 times) larger than that of each of the plurality of images IM1 to IM4. As illustrated in FIG. 2, at least pixels provided with a color filter corresponding to a first color X (e.g., G) and pixels provided with a color filter corresponding to a second color Y (e.g., R) are arranged in the image sensor 112. As described above with reference to FIG. 3 and the like, the estimation calculation section 132 estimates the pixel values $c^X_{x,y}$ of the high-resolution image corresponding to the first color X based on the pixel values $a^Y_{x,y}$ of the plurality of images IM1 to IM4 corresponding to the second color Y when the estimation calculation section 132 has determined that the pixel values $a^X_{x,y}$ of the plurality of images IM1 to IM4 corresponding to the first color X and the pixel values $a^Y_{x,y}$ of the plurality of images IM1 to IM4 corresponding to the second color Y have a high correlation.

For example, the image processing device corresponds to a circuit device that implements the signal processing section 130 illustrated in FIG. 1. The image acquisition section corresponds to the preprocessing section 131 that acquires the image data from the memory 125 through the memory controller 124 and the bus 121. When the estimation process is performed by an information processing device (e.g., PC 140) that is provided outside the imaging device 100, the image processing device corresponds to the information processing device that is provided outside the imaging device 100, and the image acquisition section corresponds to an interface section (not illustrated in FIG. 1) that receives the image data from the external interface 126. As described above with reference to FIG. 7 and the like, the pixel value $c^X_{x,y}$ corresponding to the first color X is estimated based on the pixel value $a^Y_{x,y}$ corresponding to the second color Y by estimating the pixel value $b^X_{x,y}$ from the pixel value $a^Y_{x,y}$, and estimating the pixel value $c^X_{x,y}$ using the pixel value $b^X_{x,y}$.

According to this configuration, it is possible to capture an image while performing the pixel shift without causing a decrease in resolution even if the number of pixel shifts is reduced as compared with a known method (e.g., JP-A-11-18097 and JP-A-2005-143031). Specifically, when the interval between the pixels corresponding to an identical color is equal to or larger than 2 pixels (e.g., the synthesized image GM illustrated in FIG. 4), a high-frequency component is lost when using a normal interpolation process, and it is difficult to obtain a high resolution. According to the embodiments of the invention, since the color X can be estimated using the color Y when the color X and the color Y have a high correlation, a decrease in resolution rarely occurs even when the interval between the pixels corresponding to an identical color is equal to or larger than 2 pixels. This makes it possible to reduce the number of pixel shifts to 2×2 (see FIG. 2). Since the pixel that cannot be calculated by the estimation process is interpolated in a state in which the interval between the pixels corresponding to an identical color is 1 pixel (see FIGS. 10 and 13), it is possible to minimize a decrease in resolution due to the interpolation process. Since the imaging time can be reduced by thus reducing the number of pixel shifts, it is possible to obtain a high-quality image even when the object changes with the passage of time (e.g., when observing a moving object or fluorescence).

As described above with reference to FIG. 4 and the like, the synthesized image GM may include at least two adjacent pixels (e.g., $a^R_{x-2,y}$ and $a^R_{x-1,y}$ in FIG. 5A) corresponding to the second color Y, the synthesized image GM being an image in which the pixel values of the plurality of images IM1 to IM4 are disposed at the pixel positions corresponding to the shift. The estimation calculation section 132 may calculate the difference in pixel value corresponding to the first color X between two pixels (the right side of the expression (10)) using the difference in pixel value corresponding to the second color Y between two pixels (the right side of the expression (11)) when the estimation calculation section 132 has determined that the first color X and the second color Y have a high correlation, and estimate the high-resolution image based on the calculated difference.

The synthesized image GM may include pixels (e.g., $a^G_{x-3,y}$ and $a^G_{x,y}$ in FIG. 5) corresponding to the first color X on either side of two pixels. The estimation calculation section 132 may calculate the difference in pixel value corresponding to the first color X between two pixels (the right side of the expression (10)) using the difference in pixel value corresponding to the first color X between pixels on either side thereof (the right side of the expression (13)) when the estimation calculation section 132 has determined that the pixel values $a^X_{x,y}$ of the plurality of images IM1 to IM4 corresponding to the first color X and the pixel values $a^Y_{x,y}$ of the plurality of images IM1 to IM4 corresponding to the second color Y have a low correlation.

Note that the estimation calculation section 132 may generate the synthesized image GM that includes two adjacent pixels corresponding to the second color Y, or may refer to a plurality of images IM1 to IM4 that include at least two adjacent pixels corresponding to the second color Y when the pixels are disposed in the same manner as in the synthesized image GM. Specifically, the synthesized image GM need not necessarily be generated.

According to this configuration, when the color X and the color Y have a high correlation around (bold solid line) the processing target pixels (dotted line) of the synthesized image GM (see FIGS. 5A and 5B), the pixel value corresponding to the color X can be estimated using the pixel value corresponding to the color Y utilizing the correlation. As described above with reference to FIG. 9 and the like, when the color X and the color Y have a low correlation around the processing target pixels, a situation in which the pixel value is erroneously estimated can be prevented by estimating the pixel value corresponding to the color X using the pixel value corresponding to the color X.

As described above with reference to FIGS. 6A and 6B and the like, the pixel value $a_{x,y}$ of the first pixel and the pixel value $a_{x+i,y}$ of the second pixel may respectively correspond to the sum of the pixel values of a plurality of pixels (2×2 pixel values $c_{x,y}$) of the high-resolution image. A plurality of pixels that correspond to the first pixel and a plurality of pixels that correspond to the second pixel may include common pixels (the pixels $c_{x,y-1}$ and $c_{x,y}$ included in the pixel $b_{x,y}$). The estimation calculation section 132 may calculate the difference between the sum ($b^G_{x-1,y}$) of a plurality of pixels that correspond to the second pixel (e.g., $a^R_{x-i,y}$ in FIG. 7) excluding the common pixel ($b^G_{x-2,y}$) and the sum ($b^G_{x-3, y}$) of a plurality of pixels that correspond to the first pixel ($a^R_{x-2, y}$) excluding the common pixel ($b^G_{x-2, y}$) (the left side of the expression (10)) using the difference in pixel value corresponding to the first color between two pixels (the right side of the expression (11) or the right side of the expression (13)).

This makes it possible to estimate the high-resolution image by utilizing the configuration in which the optical image information is captured to overlap at a ½ pixel pitch. Specifically, the difference between the estimated pixel values $b^X_{x, y}$ can be expressed by the difference between the pixel values $a^X_{x, y}$ (see the expression (10)). The estimation process can be performed by calculating the difference between the pixel values $a^X_{x, y}$ using the expression (11) or (13) corresponding to the degree of color correlation.

As described above with reference to FIGS. 7 and 10, the estimation calculation section 132 may calculate the intermediate pixel value ($b^X_{x, y}$ (estimated pixel value)) that is the sum of the pixel values of two pixels of the high-resolution image arranged along the vertical scan direction based on the pixel values ($a^X_{x, y}$ and $a^Y_{x, y}$) the first to fourth images IM1 to IM4, and estimate the pixel value ($c^X_{x, y}$) of the high-resolution image based on the intermediate pixel value ($b^X_{x, y}$).

This makes it possible to increase the resolution in the horizontal scan direction utilizing the overlap of the pixels in the horizontal scan direction to calculate the intermediate pixel value ($b^X_{x, y}$), and increase the resolution in the vertical scan direction utilizing the overlap of the pixels in the vertical scan direction to calculate the pixel value ($C^X_{x, y}$) of the high-resolution image.

Figure 7:
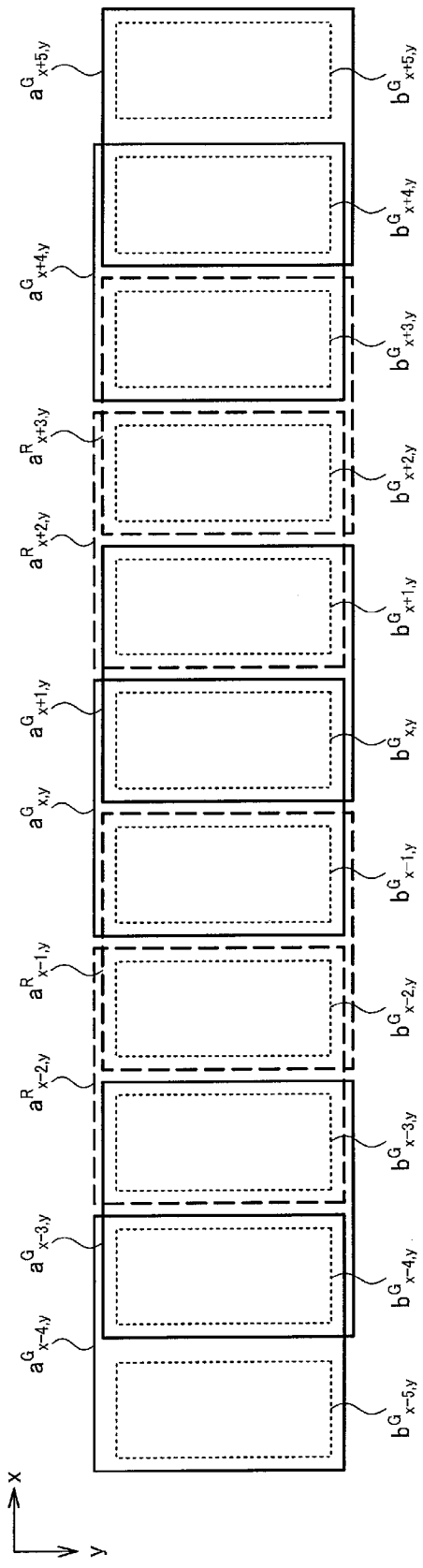
FIG. 7 is a view illustrating a pixel estimation process.

As illustrated in FIG. 7, first to eleventh intermediate pixel values $b^G_{x-5, y}$ to $b^G_{x+5, y}$ may be arranged along the horizontal scan direction. The sum of the first intermediate pixel value $b^G_{x-5, y}$ and the second intermediate pixel value $b^G_{x-4, y}$ may correspond to the first pixel value $a^G_{x-4, y}$ that is the pixel value of the synthesized image GM corresponding to the first color X. The sum of the second intermediate pixel value $b^G_{x-4, y}$ and the third intermediate pixel value $b^G_{x-3, y}$ may correspond to the second pixel value $a^G_{x-3, y}$ that is the pixel value corresponding to the first color X adjacent to the first pixel value $a^G_{x-4, y}$. The estimation calculation section 132 may calculate a first error $\delta^X_{x-4, y}$ (see FIG. 8 and the expression (8)) that is an error between the first to third intermediate pixel values, and the true value on the assumption that the first to third intermediate pixel values change linearly along the horizontal scan direction (see the expression (6)). The estimation calculation section 132 may determine the first to third intermediate pixel values $b^G_{x-5, y}$ to $b^G_{x-3, y}$ using the calculated first error $\delta^X_{x-4, y}$.

Specifically, the estimation calculation section 132 may calculate a first difference between the third intermediate pixel value $b^G_{x-3, y}$ and the fifth intermediate pixel $b^G_{x-1, y}$ (the left side of the expression (11) (first expression)) using the difference between the second pixel value ($a^R_{x-1, y}$) and the first pixel value ($a^R_{x-2, y}$) (the right side of the expression (11) (first expression)) when the estimation calculation section 132 has determined that the color X and the color Y have a high correlation, and determine the first error $\delta^X_{x-4, y}$ so that the calculated first difference is satisfied.

More specifically, the estimation calculation section 132 may calculate a second error $\delta^X_{x, y}$ with respect to the fifth to seventh intermediate pixel values $b^G_{x-1, y}$ to $b^G_{x+1, y}$ (see FIG. 8 and the expression (8)), calculate a third error $\delta^X_{x+4, y}$ with respect to the ninth to eleventh intermediate pixel values $b^G_{x+3, y}$ to $b^G_{x+5, y}$ (see FIG. 8 and the expression (8)), calculate a second difference between the seventh and ninth intermediate pixel values ($b^G_{x+1, y}$ and $b^G_{x+3, y}$) (the left side of the expression (11) (second expression)), and determine the first error $\delta^X_{x-4, y}$, the second error $\delta^X_{x, y}$, and the third error $\delta^X_{x+4, y}$ so that the first difference and the second difference are satisfied, and the sum of squares $S_\delta$ of the first error, the second error, and the third error (expression (11)) becomes a minimum.

This makes it possible to calculate the intermediate pixel value $b^X_{x, y}$ (estimated pixel value) from the images captured while performing the pixel shift at a ½ pixel pitch. Specifically, the intermediate pixel value $b^X_{x, y}$ at each pixel position can be estimated from the synthesized image GM in which the pixels corresponding to the color X are arranged every two pixels along the horizontal scan direction. It is expected that an estimated value that is close to the actual pixel value can be obtained by utilizing the eleven intermediate pixel values $b^X_{x, y}$ as the processing unit as compared with the case of utilizing a smaller number of intermediate pixel values as the processing unit. It is possible to reduce the number of variables to be estimated, and simplify the estimation process by setting one error with respect to three intermediate pixel values. It is possible to obtain two conditional expressions that should be satisfied by the first to third errors (i.e., an expression obtained by substituting the expression (9) into the expression (11)) by calculating the first and second differences that link the first to third errors, and determine the first to third errors using the above conditions and the condition whereby the sum of squares $S_\delta$ becomes a minimum.

As described above with reference to FIG. 5, the estimation calculation section 132 may calculate the correlation value C (see the expressions (1) to (3)) between the pixel value corresponding to the first color X (e.g., G) and the pixel value corresponding to the second color Y (e.g., R) situated in the synthesized image GM around (bold solid line) the estimation target pixels (dotted line). The estimation calculation section 132 may determine that the first color X and the second color Y have a high correlation when the correlation value C is larger than the first threshold value $C_0$ and smaller than the second threshold value $C_1$.

This makes it possible to calculate the correlation value C between the color X and the color Y around the estimation target pixels, and determine the degree of correlation based on the correlation value C. Specifically, it is determined that the color X and the color Y have a high correlation when the correlation value C satisfies the given condition "$C_0 < C < C_1$".

The image processing device and the like according to the embodiments of the invention may include a processor and a memory. The processor may be a central processing unit (CPU), for example. Note that the processor is not limited to a CPU. Various processors such as a graphics processing unit (GPU) or a digital signal processor (DSP) may also be used. The processor may be a hardware circuit that includes an ASIC. The memory stores a computer-readable instruction. Each section of the image processing device and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of this invention. Any term cited with a different term having a broader meaning or the same meaning at least once in the specification and the drawings can be replaced by the different term in any place in the specification and the drawings. The configuration and the operation of the image processing device, the imaging device, and the like are not limited to those described in connection with the above embodiments. Various modifications and variations may be made.

What is claimed is:

1. An image processing device comprising:
a processor comprising hardware, wherein the processor is configured to:
  acquire a plurality of images, the plurality of images having been captured while sequentially shifting relative positions of a light-receiving plane of an image sensor and an image formed in the light-receiving plane; and
  estimate a high-resolution image based on the plurality of images, the high-resolution image having a number of pixels larger than that of each of the plurality of images,
  wherein at least pixels provided with a color filter corresponding to a first color and pixels provided with a color filter corresponding to a second color are arranged in the image sensor, and
  wherein a synthesized image includes at least two adjacent pixels corresponding to the second color, the synthesized image being an image in which the pixel values of the plurality of images are disposed at pixel positions corresponding to the shift, and
  wherein in estimating the high-resolution image based on the plurality of images, the processor is configured to calculate a difference in pixel value corresponding to the first color between the two pixels using a difference in pixel value corresponding to the second color between the two pixels when the processor determines that the pixel values of the plurality of images corresponding to the first color and the pixel values of the plurality of images corresponding to the second color have a high correlation, and estimate the high-resolution image based on the calculated difference.

2. The image processing device as defined in claim 1,
wherein the synthesized image includes pixels corresponding to the first color on either side of the two pixels, and
wherein in estimating the high-resolution image based on the plurality of images, the processor is configured to calculate the difference in pixel value corresponding to the first color between the two pixels using a difference in pixel value corresponding to the first color between the pixels on either side of the two pixels when the processor determines that the pixel values of the plurality of images corresponding to the first color and the pixel values of the plurality of images corresponding to the second color have a low correlation.

3. The image processing device as defined in claim 1,
wherein a pixel value of a first pixel that makes up the two pixels and a pixel value of a second pixel that makes up the two pixels respectively corresponding to a sum of pixel values of a plurality of pixels of the high-resolution image, and a plurality of pixels that correspond to the first pixel and a plurality of pixels that correspond to the second pixel including a common pixel, and
wherein in estimating the high-resolution image based on the plurality of images, the processor is configured to calculate a difference between a sum of the pixel values of the plurality of pixels that correspond to the second pixel and exclude the common pixel and a sum of the pixel values of the plurality of pixels that correspond to the first pixel and exclude the common pixel using the calculated difference in pixel value corresponding to the first color between the two pixels.

4. The image processing device as defined in claim 1,
wherein the processor is configured to acquire a first image, a second image, a third image, and a fourth image as the plurality of images, the first image having been captured at a reference position of the relative positions, the second image having been captured at a position that is shifted by a ½ pixel pitch from the reference position in a horizontal scan direction, the third image having been captured at a position that is shifted by the ½ pixel pitch from the reference position in a vertical scan direction, and the fourth image having been captured at a position that is shifted by the ½ pixel pitch from the reference position in the horizontal scan direction and shifted by the ½ pixel pitch from the reference position in the vertical scan direction, and
wherein in estimating the high-resolution image based on the plurality of images, the processor is configured to estimate an image having a number of pixels four times larger than that of each of the acquired plurality of images as the high-resolution image.

5. The image processing device as defined in claim 4,
wherein the pixels provided with the color filter corresponding to the first color and the pixels provided with the color filter corresponding to the second color are alternately arranged in the image sensor along the horizontal scan direction,
wherein pixel values of 2×2 pixels corresponding to the first color and pixel values of 2×2 pixels corresponding to the second color are alternately arranged in a synthesized image along the horizontal scan direction, the synthesized image is an image in which pixel values of the first image, the second image, the third image, and the fourth image are disposed at pixel positions corresponding to the shift, and
wherein in estimating the high-resolution image based on the plurality of images, the processor is configured to estimate the pixel value corresponding to the first color and the pixel value corresponding to the second color at each pixel of the synthesized image as the pixel values of the high-resolution image.

6. The image processing device as defined in claim 4,
wherein in estimating the high-resolution image based on the plurality of images, the processor is configured to calculate intermediate pixel values based on the pixel values of the first image, the second image, the third image, and the fourth image, and estimating the pixel values of the high-resolution image based on the intermediate pixel values, the intermediate pixel values being a sum of pixel values of two pixels of the high-resolution image that are arranged along the vertical scan direction.

7. The image processing device as defined in claim 6,
wherein a first intermediate pixel value, a second intermediate pixel value, and a third intermediate pixel value are arranged along the horizontal scan direction, a sum of the first intermediate pixel value and the second intermediate pixel value corresponding to a first pixel value that is a pixel value of the synthesized image corresponding to the first color, and a sum of the second intermediate pixel value and the third intermediate pixel value corresponding to a second pixel value that is a pixel value corresponding to the first color adjacent to the first pixel value, and wherein in estimating the high-resolution image based on the plurality of images, the processor is configured to calculate a first error that is an error between each of the first intermediate pixel value, the second intermediate pixel value, and the third intermediate pixel value, and a true value on the assumption that the first intermediate pixel value, the second intermediate pixel value, the third intermediate pixel value change linearly along the horizontal scan direction, and determine the first intermediate pixel value, the second intermediate pixel value, and the third intermediate pixel value using the calculated first error.

8. The image processing device as defined in claim 7, wherein the first intermediate pixel value, the second intermediate pixel value, the third intermediate pixel value, a fourth intermediate pixel value, and a fifth intermediate pixel value are arranged along the horizontal scan direction, and wherein in estimating the high-resolution image based on the plurality of images, the processor is configured to calculate a first difference between the third intermediate pixel value and the fifth intermediate pixel value using a difference between the second pixel value and the first pixel value when the processor determines that the pixel values corresponding to the first color and the pixel values corresponding to the second color have a high correlation, and determine the first error so that the calculated first difference is satisfied.

9. The image processing device as defined in claim 8, wherein the first intermediate pixel value, the second intermediate pixel value, the third intermediate pixel value, the fourth intermediate pixel value, the fifth intermediate pixel value, a sixth intermediate pixel value, a seventh intermediate pixel value, an eighth intermediate pixel value, a ninth intermediate pixel value, a tenth intermediate pixel value, and an eleventh intermediate pixel value are arranged along the horizontal scan direction, and wherein in estimating the high-resolution image based on the plurality of images, the processor is configured to calculate a second error with respect to the fifth intermediate pixel value, the sixth intermediate pixel value, and the seventh intermediate pixel value, calculate a third error with respect to the ninth intermediate pixel value, the tenth intermediate pixel value, and the eleventh intermediate pixel value, calculate a second difference between the seventh intermediate pixel value and the ninth intermediate pixel value, and determine the first error, the second error, and the third error so that the first difference and the second difference are satisfied, and a sum of squares of the first error, the second error, and the third error becomes a minimum.

10. The image processing device as defined in claim 1, wherein in estimating the high-resolution image based on the plurality of images, the processor is configured to calculate a correlation value between the pixel values corresponding to the first color and the pixel values corresponding to the second color situated in a synthesized image around estimation target pixels, and determining that the pixel values corresponding to the first color and the pixel values corresponding to the second color have a high correlation when the correlation value is larger than a first threshold value and smaller than a second threshold value, the synthesized image being an image in which the pixel values of the plurality of images are disposed at pixel positions corresponding to the shift.

11. The image processing device as defined in claim 1, wherein the image sensor includes a color filter in which 2×2-pixel units are repeatedly arranged.

12. The image processing device as defined in claim 11, wherein the color filter is a color filter having an RGB Bayer array.

13. An imaging device comprising:
the image processing device as defined in claim 1; and
the image sensor.

14. An image processing method comprising:
acquiring a plurality of images captured while sequentially shifting relative positions of a light-receiving plane of an image sensor and an image formed in the light-receiving plane, at least pixels provided with a color filter corresponding to a first color and pixels provided with a color filter corresponding to a second color being arranged in the image sensor; and
calculating a difference in pixel value corresponding to the first color between the two pixels using a difference in pixel value corresponding to the second color between the two pixels when it has been determined that the pixel values of the plurality of images corresponding to the first color and the pixel values of the plurality of images corresponding to the second color have a high correlation, and estimating a high-resolution image having a number of pixels larger than that of each of the plurality of images based on the calculated difference.

15. A non-transitory computer-readable storage device storing instructions that, when executed by a processor, causes to the processor to:
acquire a plurality of images captured while sequentially shifting relative positions of a light-receiving plane of an image sensor and an image formed in the light-receiving plane, at least pixels provided with a color filter corresponding to a first color and pixels provided with a color filter corresponding to a second color being arranged in the image sensor; and
calculate a difference in pixel value corresponding to the first color between the two pixels using a difference in pixel value corresponding to the second color between the two pixels when it has been determined that the pixel values of the plurality of images corresponding to the first color and the pixel values of the plurality of images corresponding to the second color have a high correlation, and estimate a high-resolution image having a number of pixels larger than that of each of the plurality of images based on the calculated difference.

* * * * *